United States Patent [19]
Range

[11] Patent Number: 5,366,123
[45] Date of Patent: Nov. 22, 1994

[54] DETACHABLE CARRIER FOR SHOPPING CARTS

[76] Inventor: Clyde M. Range, P.O. Box 1649, Oroville, Wash. 98844

[21] Appl. No.: 120,936

[22] Filed: Sep. 14, 1993

[51] Int. Cl.⁵ .............................................. B60R 9/00
[52] U.S. Cl. .............................. 224/42.43; 280/33.992
[58] Field of Search .......... 224/42.43, 42.42, 42.45 R, 224/273, 277, 36, 32 R; 280/33.991, 33.992, 33.993, 32.7, DIG. 4; 248/313, 316.1, 224.3; 403/315; 292/230, 238; 24/598.7, 598.3, 598.9, 599.1, 598.8

[56] References Cited

U.S. PATENT DOCUMENTS

| | | | |
|---|---|---|---|
| D. 154,640 | 7/1949 | Sasser | D14/3 |
| 1,261,143 | 4/1918 | McWilliams | 224/42.43 |
| 2,508,670 | 5/1950 | Goldman | 280/DIG. 4 |
| 2,615,726 | 10/1952 | Brottman | |
| 2,662,775 | 12/1953 | Goldman | |
| 2,889,151 | 6/1959 | Sides | |
| 2,890,058 | 6/1959 | Cauthon | |
| 2,903,269 | 9/1959 | Hennion | |
| 3,026,122 | 3/1962 | Young | |
| 3,351,380 | 11/1967 | Sprague | 297/377 |
| 3,361,438 | 1/1968 | Davis | 280/33.991 |
| 3,774,929 | 11/1973 | Stanley | 280/36 |
| 3,921,870 | 11/1975 | Camp | 224/42.43 |
| 4,324,430 | 4/1982 | Dimas, Jr. et al. | 297/250 |
| 4,376,502 | 3/1983 | Cohen | 280/33.992 |
| 4,403,807 | 9/1983 | Wilkinson et al. | 297/217 |
| 4,598,945 | 7/1986 | Hopkins | 280/33.99 |
| 4,685,701 | 8/1987 | Amundson et al. | 224/277 |
| 4,834,404 | 5/1989 | Wood | 280/33.993 |
| 4,861,105 | 8/1989 | Merten et al. | 297/250 |
| 4,930,795 | 6/1990 | Tannehill et al. | 280/33.992 |

FOREIGN PATENT DOCUMENTS

| | | | |
|---|---|---|---|
| 632862 | 6/1963 | Belgium | 24/598.9 |
| 458148 | 7/1949 | Canada | 224/42.46 R |
| 1115412 | 4/1956 | France | 24/522 |

Primary Examiner—Henry J. Recla
Assistant Examiner—Gregory M. Vidovich
Attorney, Agent, or Firm—Wells, St. John, Roberts, Gregory & Matkin

[57] ABSTRACT

A detachable carrier for shopping carts that include elevationally spaced horizontal top and bottom cart basket frame members, and a handle situated rearwardly of the basket. The carrier includes a carrier basket with first hook members extending forwardly of the front basket wall and elevationally spaced second hook members on the carrier basket. The second hook members are upwardly inclined, with hook throats opening rearwardly toward the carrier basket. Latch tubes on the second hook members are loosely mounted to the inclined shank sections of the second hook members and are retained on the second hook members to releasably latch and lock against the cart basket frame member, to safely secure the carrier to the cart. The latch tube members can be elevationally lifted to unlocked positions, thereby enabling release and removal of the carrier from the shopping cart. Bottom, first hook members cooperate with the top, second hook members to releasably secure the carrier to the cart.

12 Claims, 5 Drawing Sheets

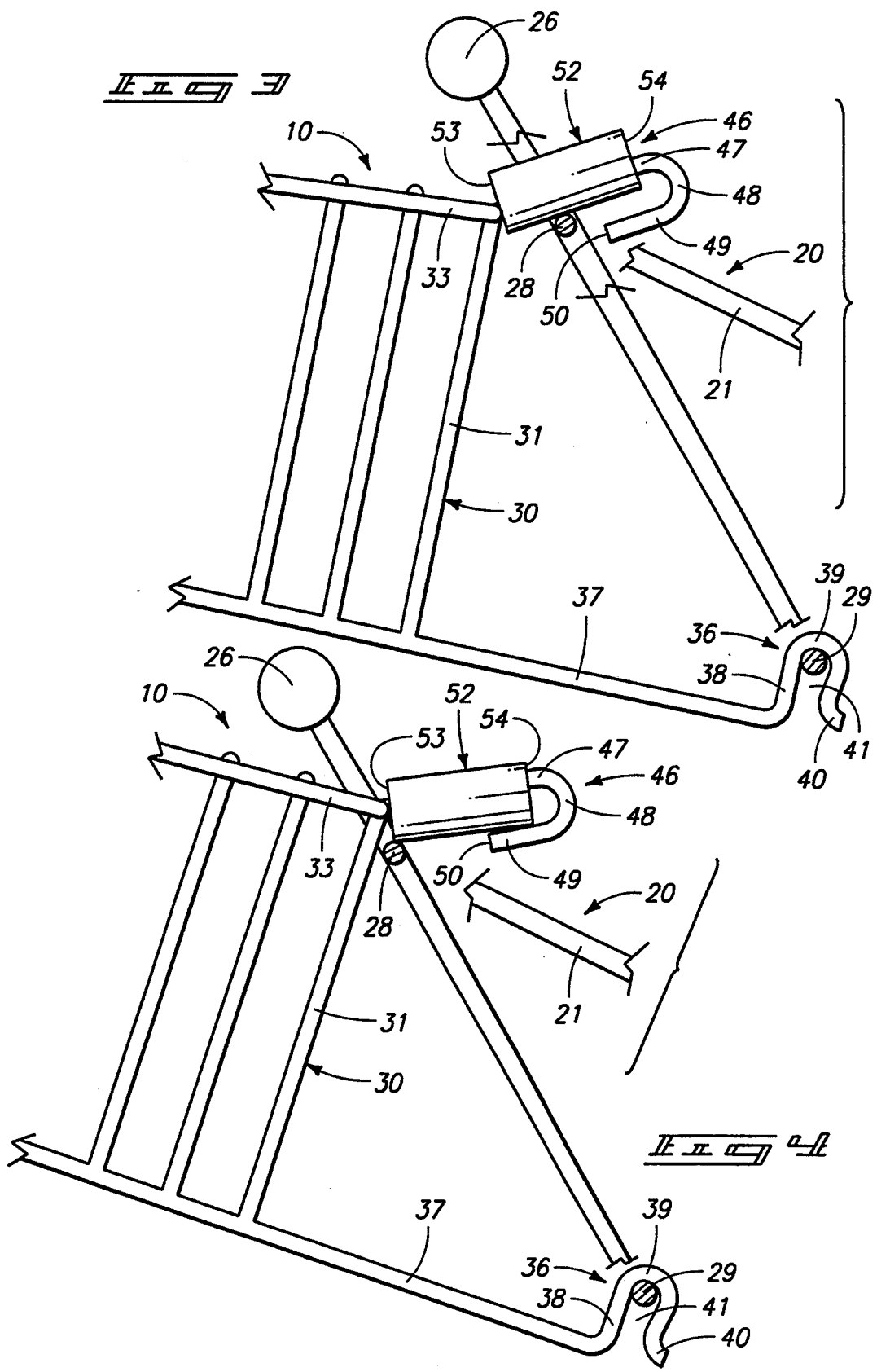

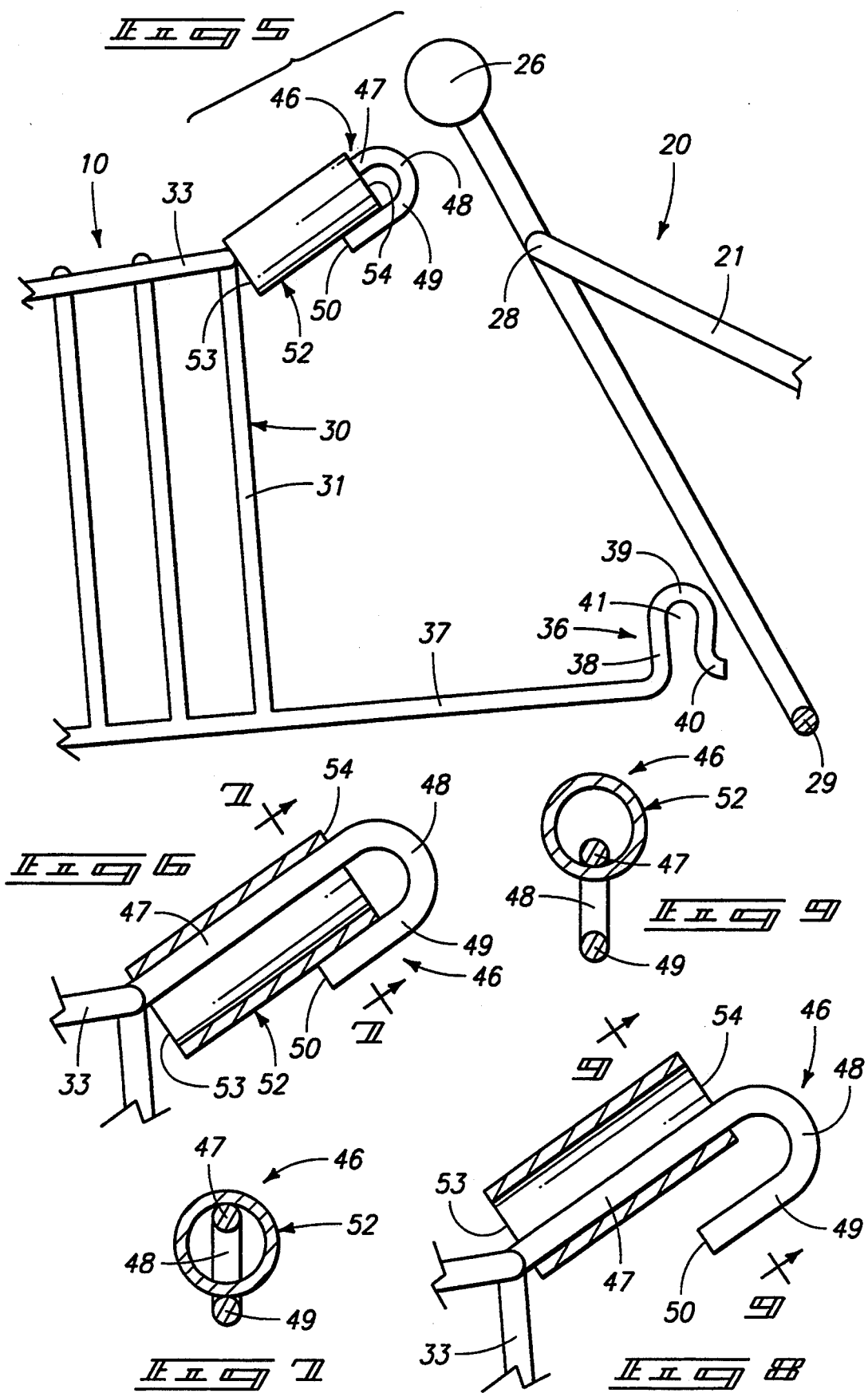

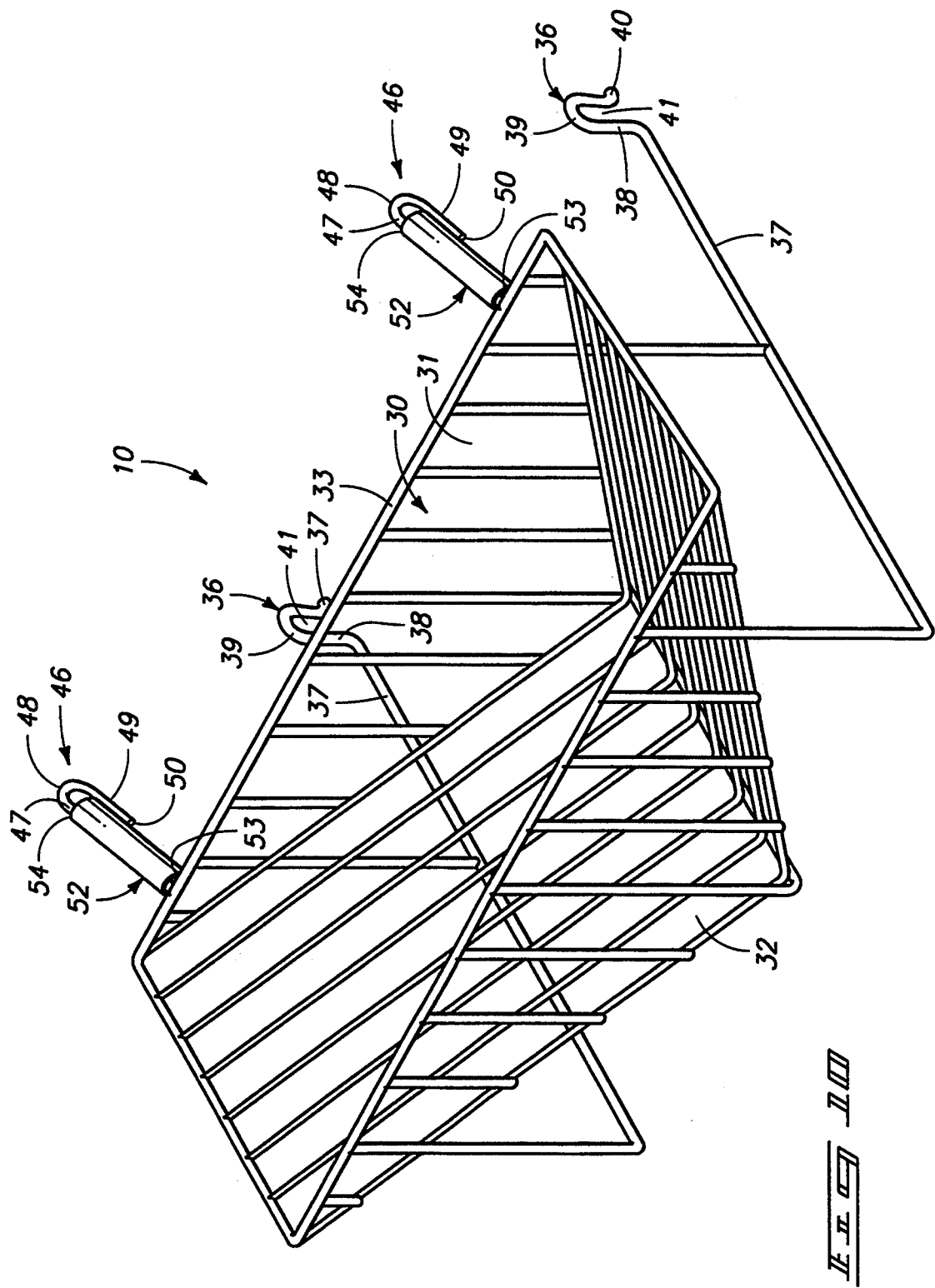

DETACHABLE CARRIER FOR SHOPPING CARTS

TECHNICAL FIELD

The present invention relates to auxiliary carrier attachments for shopping carts.

BACKGROUND OF THE INVENTION

Detachable carrier arrangements have been provided in the past for shopping carts, particularly grocery shopping carts where it is desirable to obtain either additional carrying space along the cart, or to provide support for carrying an infant or small child. Such carriers have met with difficulties both in mounting to the shopping carts, and in safety features.

U.S. Pat. No. 4,403,807 to Wilkinson et at. shows a baby seat attachment device for hooking engagement with a shopping cart or similar vehicle. Connecting hook arm members are provided at an upper edge or boundary of the carrier for connection to the front end of a shopping cart. The device also includes a leveling arrangement extending below the cart engaging hooks, but provides no lower hook connecting members to secure the carrier to the shopping cart.

U.S. Pat. No. 2,662,775 to Goldman discloses a child seat for store service carriers that closely resembles existing forms of inboard child carriers provided on many current grocery cart configurations. However, the Goldman apparatus is an attachment, with hooks at the upward or top end of the attachment frame. The lower or bottom portions of the carrier are not provided with hooks for attachment to the cart structure, but simply include downwardly projecting leg members that are pressed against the cart frame by the cantilevered weight of the child in the carrier.

U.S. Pat. No. 3,351,380 to Sprague discloses an infant carrier for use with shopping carts in which the carrier structure is mounted between the handle of the shopping cart and a brace member on the bottom side of the formed carrier structure. This entire unit projects above the top opening of the shopping cart, and above the handle. The Sprague carrier also includes pairs of substantially "U" shaped clips having elastomeric coverings for securing the members at ends of brace arms to secure the brace in place on a shopping cart. However, it does not appear that the connecting structure would be useful for securing the carrier at any location other than substantially overlying the cart opening and in the vicinity of the push handle for the cart. The downwardly open configuration of the "U" shaped clips would not permit another orientation for the carrier, nor could the carrier configuration itself be otherwise oriented on the cart.

U.S. Pat. No. 2,615,726 to Brottman discloses a shopping cart in which a child seat is situated on a rearward portion of the support assembly between the load receptacle and a wheeled base. The child support is also situated below the push cart handles, thereby locating the child for easy access and for safety during use of the cart. However, the child seat appears to be permanently attached to the cart frame.

A handle mounted baby seat is shown in U.S. Pat. No. 2,889,151 to Sides. This patent discloses a folding frame for an infant seat with a hooked portion that is pivoted to the cart handle, and a remaining frame portion secured to the top horizontal member of the cart basket. A spring actuated linkage arrangement is provided on the lower catch member to releasably secure the seat in its operative condition. The seat elevates the child or infant above the level of the push handle for the cart.

Of the above references, none disclose a detachable carrier for shopping carts which may be releasably attached to a shopping cart below the push bar and along the rearward wall of the basket by secure, locking attachment features that connect both the top and the bottom portions of the detachable carrier to the cart. A need for such a carrier exists, with features such as those exemplified above to maximize safety and operation of the device and convenience to the user.

BRIEF DESCRIPTION OF THE DRAWINGS

A preferred form of the present invention is illustrated in the accompanying drawings, in which:

FIGS. 2-5 are enlarged fragmentary views of a portion of a cart and a forward part of the preferred carrier showing mounting and dismounting to the cart;

FIG. 6 is an enlarged longitudinal sectional view illustrating a second hook member and latch tube member for the present carrier;

FIG. 7 is a transverse sectional view taken along line 7—7 in FIG. 6;

FIG. 8 is a view similar to FIG. 6 only showing an open condition of the latch tube member;

FIG. 9 is a transverse sectional view taken along line 9—9 in FIG. 8;

FIG. 10 is a perspective view of the preferred present carrier; and

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
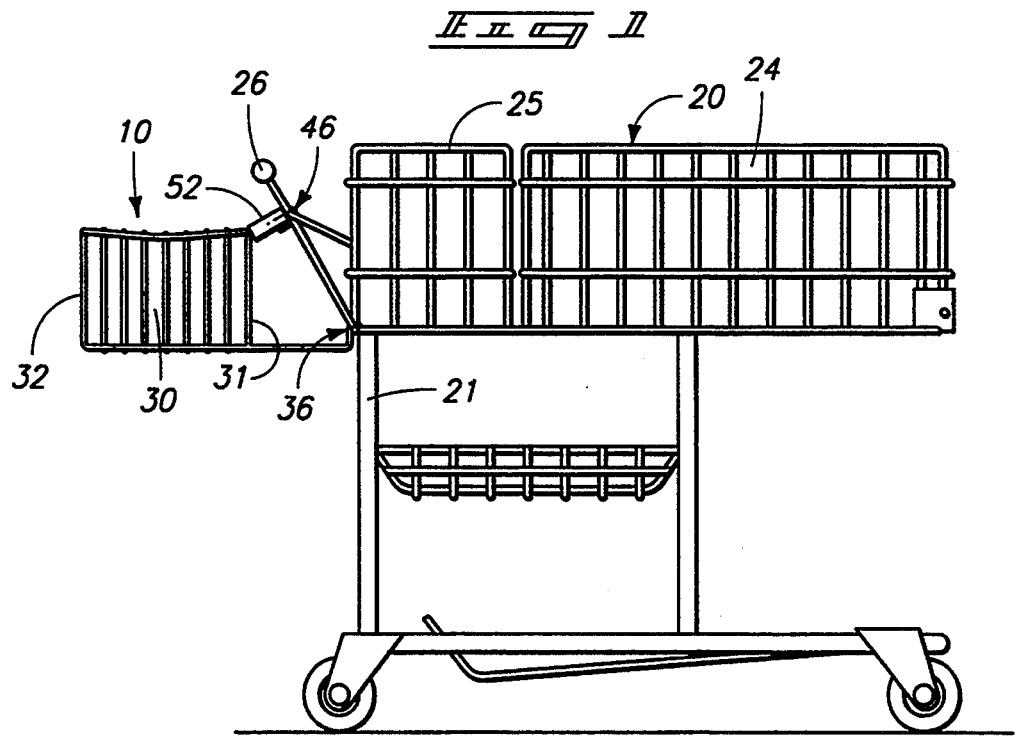
FIG. 1 is a side elevational view of a shopping cart with a preferred form of the present carrier releasably attached thereto.

A detachable carrier exemplifying preferred elements of the present invention is exemplified in the drawings and is generally designated therein by the reference character 10. The preferred carrier 10 is provided specifically to be releasably mounted to shopping carts of the general nature shown in FIG. 1 by reference numeral 20. The shopping cart 20, for purposes in describing the present carrier, is of a conventional variety, including a wheel supported framework 21 mounting an upright tubular framework with a wire frame basket 24 thereto. The typical basket 24 includes an auxiliary child seat or carrier portion 25 toward a rearward portion of the frame and basket. A push handle 26 projects up and rearwardly from the frame.

The basket, again for purposes of description of the present invention, includes horizontal rearward basket top frame member 28 and a horizontal bottom basket bottom frame member 29. These frame members are described to exemplify preferred portions of the basket to which the present carrier may be attached, though other parts could also be used. The exemplified basket frame members 28, 29 are located along the rearward portions of the cart adjacent the push handle 26 and are situated below the top opening of the basket.

It is emphasized that the shopping cart generally described above, and diagrammatically illustrated in the drawings is merely exemplary of many different forms of shopping carts to which the present carrier may be attached. Such carriers are well known in the merchandising industry and do not comprise a part of the present invention.

The present carrier 10 is advantageously attached in a releasable manner to the shopping cart 20 adjacent the rearward end of the basket 24 and below the handle 26. The particular location is advantageous in that the carrier 10 is situated at or slightly below the approximate level of the basket 24, not above, and is situated within easy reach of a user standing behind the push handle 26. The carrier 10 is therefore particularly suitable to carrying infants due to the safety and stability of the carrier 10 and proximity to the user.

The preferred carrier 10 includes a carrier basket 30 that may be shaped according to the carrying requirements of the user, but is preferably somewhat of a V-shape (FIG. 10) for primary use in carrying infants. The basket 30 includes a front wall 31 and a rearwardly spaced rear wall 32. A relatively rigid rim frame 33 extends about the basket to provide support to the basket portion 24 and to mount shopping cart attachment elements which will be described in greater detail below.

The rim frame 33 includes a pair of rods 37, advantageously projecting forwardly from the bottom of the front basket wall 31. The rods are spaced apart along the carrier basket length (FIG. 10). Ends of the rods 37 form first hook members 36 that releasably receive the bottom cart basket frame member 29. The first hook members 36 are formed integrally with the rods 37, by first upwardly bent portions 38 that lead to forwardly bent portions 39 that, in turn, lead into downwardly bent portions 40. The first hook portions 38–40 define downwardly facing, open recesses 41 that are shaped to loosely and releasably receive the bottom cart basket frame member 29. The recesses include elevational (substantially vertical) dimensions from open to closed ends that are greater than the diameter of cart basket frame member 29 to be received.

Figure 2:
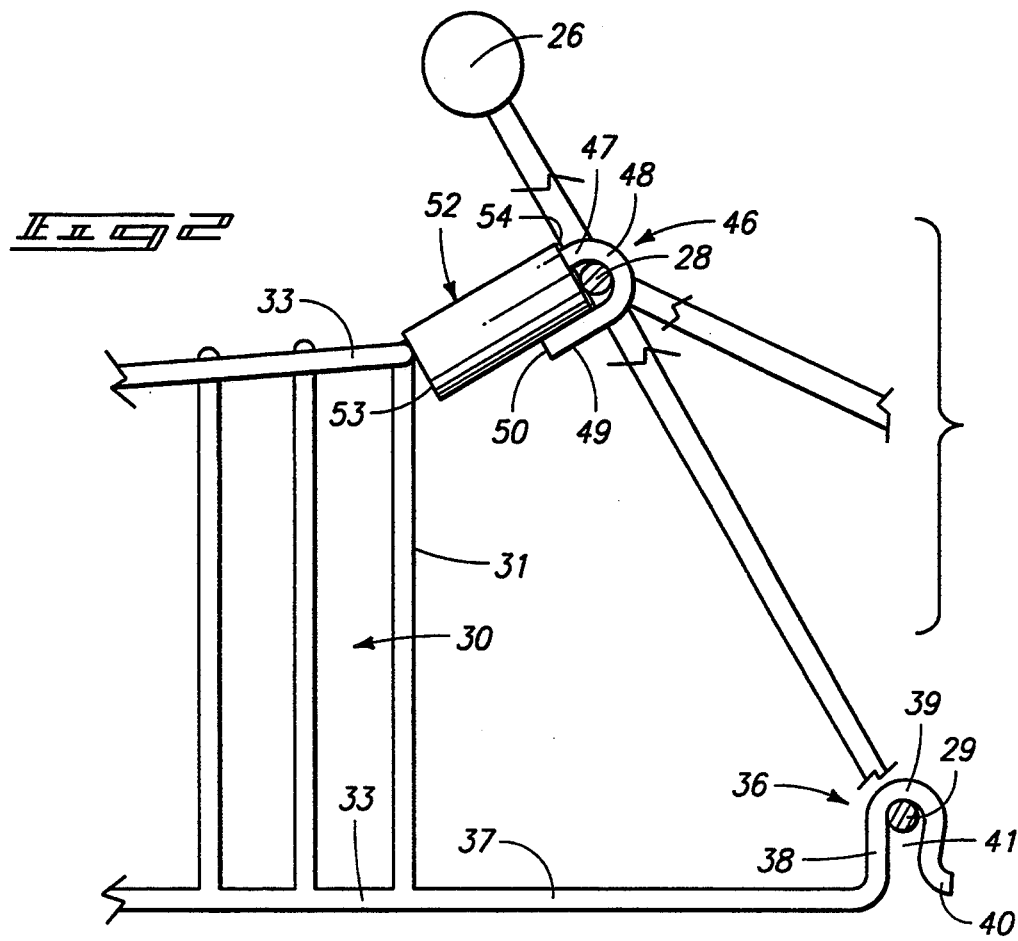

It is pointed out that the recess is somewhat vertical, and that the hook portions 38–40 are all formed upwardly of the rods 37 (FIG. 2). This minimizes the elevation of the carrier on the shopping cart, and applies the received portion of the total weight of the basket as a weight suspended from, rather than resting on—the bottom cart basket frame member 28. Safety and stability for the carrier basket are thereby enhanced.

Second hook members 46 are also provided on the carrier basket to releasably engage and secure the carrier basket to the cart basket. The second hook members 46 extend forwardly from the cart basket 24, and advantageously at an upwardly inclined angle. The first preferred second hook members 46 releasably receive the top cart basket frame member 24, thereby further supporting and stabilizing the carrier basket on the shopping cart along with the first hook members 36.

Preferred second hook members 46 are comprised of substantially rigid hook shanks 47 that extend forward and angle upwardly from the top basket frame member 28. The shanks 47 lead to downward bend sections 48 which lead into rearwardly extending hook bend sections 49. Bend sections 49 lead to hook ends 50.

The shanks 47 are substantially parallel to the rearwardly extending hook sections 49 in the preferred form, and are spaced apart to define the throat of the hook. The openings or throats of the hook shapes are sufficient to slidably receive and release the top cart basket frame member. The throat or hook openings face rearwardly as shown in FIG. 2.

Latch tubes 52 are movably received over the shanks 47 of the second hook members 46, to releasably lock the top cart basket frame member 28 within the hook throats. The tubes extend from rearward ends 53 adjacent the top basket frame member 28, to forward ends 54 that forwardly overlap the hook ends 50. It may be seen, especially in relation to FIGS. 2, 6, and 7, that the preferred axial tube lengths (between ends 53, 54) are greater than the distance along the shanks 47 from the top frame member 28 to the hook tip or end 50.

Figure 11:
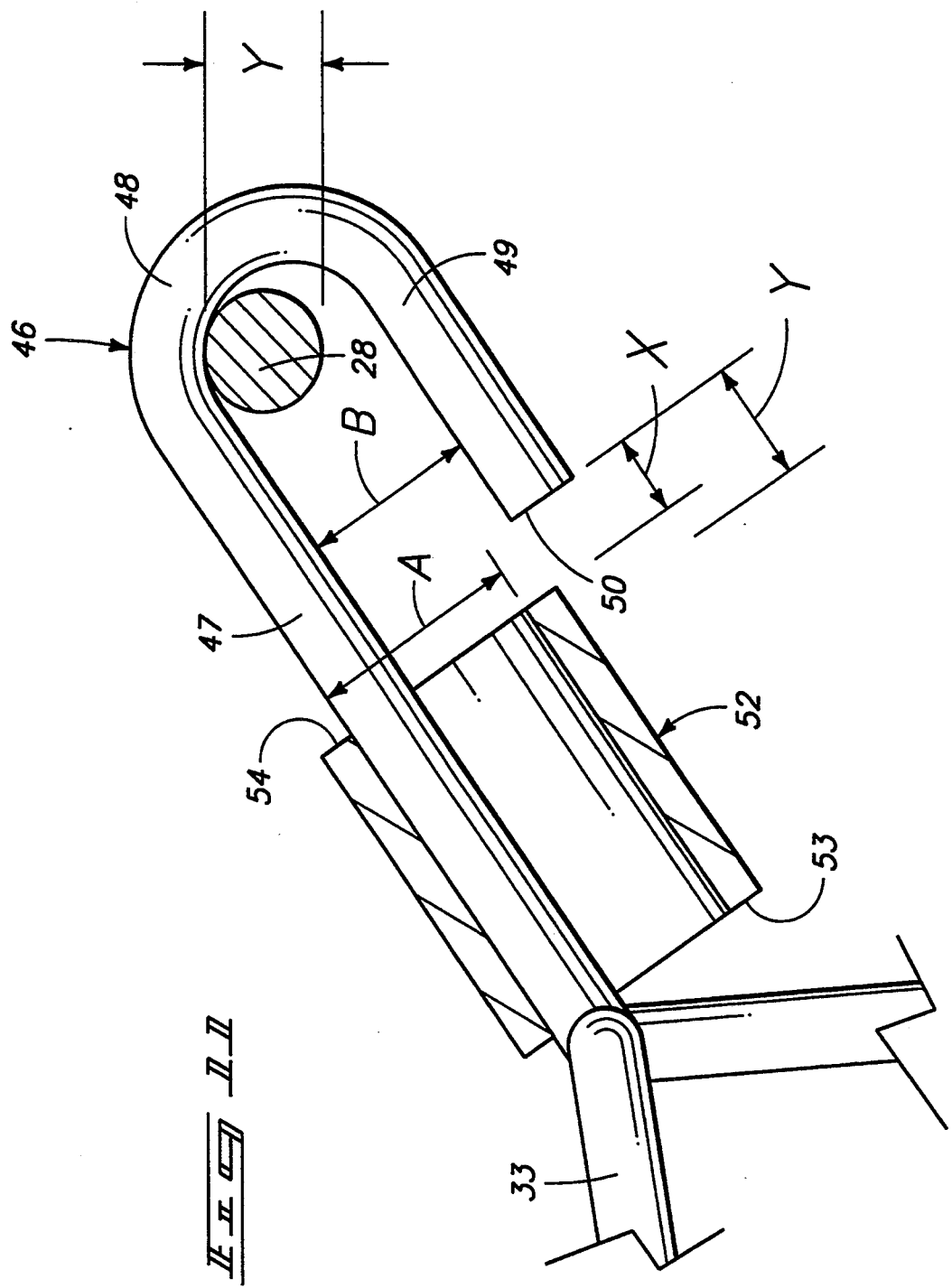
FIG. 11 is an enlarged diagrammatic view of the second hook members of a preferred form, showing dimensional relationships.

Other axial tube dimensions may also be functional for the locking intended purposes, including distances less than the spacing between the frame member 28 and hook ends 50 shown in FIGS. 2–10. It is necessary only that the axial tube lengths be such that a maximum space between the forward tube end 54 and the hook end 50 be less than the diameter of the cart basket frame member 28 to be received within the hook. These distances are illustrated diagrammatically in FIG. 11, where X represents a maximum distance between a forward tube end 54 and the hook end 50, and Y represents the diameter of the cart basket frame member 28.

The diameter of tubes 52 is also a consideration. As shown in FIGS. 6 and 8, the tube diameters are such that the tube may be moved laterally upward from the FIG. 6 position to the FIG. 8 position, thereby allowing free passage of the cart basket frame member 28. The dimension shown is such that the tube will rest on the rearward section 49 of the hook when in the latching or locked position (FIG. 6). In the unlatched or unlocked position (FIGS. 8, 9) the hook throat is open sufficiently to allow the basket frame member 28 to pass freely into or out therefrom.

Preferred tube inside diameters A are approximately equal to or slightly greater than the dimensions between the shanks 47 and rearward extending bend sections 49. Whatever tube diameters are selected, they must be such that the forward ends 54 of the tubes will substantially span the hook throats, when the tubes are in the closed, latching positions shown in FIGS. 6 and 7.

It is noted that the latch tubes 52 are freely slidable on the second hook members. They are held in place by the hook members themselves, due to the preferred overlapping relationship shown in FIGS. 2–10. This is accomplished during assembly of the second hook members simply by sliding the latch tubes 52 onto the hooks before the downward and rearward bend sections 48, 49 are formed, or by using split tubes and springing the tubes slightly, to allow them to be slid into place over pre-formed second hook members. The formed sections 48, 49 will then retain the tubes in place on the hook members.

It is also noted that the latch tubes 52 are naturally biased by gravity toward the closed, latching positions shown in FIGS. 5–7. The tubes 52 must be physically lifted to the open, release or receiving position shown in FIGS. 8 and 9. This feature greatly enhances safety by providing that the latch remain normally closed, locking the carrier to the shopping cart, but allowing access simply by lifting the latch tubes to the open positions (FIG. 8). No springs or actuators are required, the latch tubes simply fall into place behind the cart frame member 28 when the carrier is mounted to the cart. The tubes then will stay in the downward, locked position due to gravity, safely securing the carrier to the shopping cart.

To secure the present carrier 10 to a shopping cart, the user simply maneuvers the carrier so the first hook members 36 are aligned over the bottom cart frame member 29. This is preferably done with the rear carrier wall 32 elevated slightly higher than the front wall 31. The carrier 10 is then lowered vertically so the cart frame bottom member 29 is loosely received within the downwardly facing recesses 41 of the first hook members 36.

As the above happens, the second hook members 46 come into operative position in relation to the top cart basket frame member 28. The top cart basket frame member 28 first engages and lifts the latching tubes 52, toward the open position shown in FIG. 8. Once the member 28 moves elevationally above the hook ends 50 and into the throats of the hooks, the carrier 10 can be tipped downwardly, causing the second hook members 46 to slide rearwardly over the cart member 28. As the member 28 clears the forward tube ends 54, the tubes are allowed to drop down across the throats of the hooks, thereby locking the member in place as shown in FIG. 2. The carrier is now locked on the shopping cart 20 in the safe, accessible position shown in FIG. 1.

The four point engagement between the hook members and the shopping cart, along with the strength and orientation of the hook members as described assure that the carrier will not vibrate loose and fall from the cart (a drawback found in other auxiliary carriers). Plus the latching tubes automatically and naturally remain in the closed condition simply due to gravity, locking the carrier in position. In fact, a more permanent lock may be easily effected simply by inserting objects or otherwise blocking the tubes below the hook shanks to prevent the tubes from being lifted to unlock the carrier from the shopping cart.

It is noted that the lengths of the hook member shanks 47 are selected to space the carrier frame rearwardly behind the shopping cart by a prescribed distance. This distance is selected to enable use of the existing child seat portion 25 of the cart without interference by the carrier 10. The child's legs and feet will fit comfortably between the present carrier and the child seat portion 25 of the cart 20.

To remove the present carrier 10 from a shopping cart 20, the user simply lifts the latch tubes 52 substantially to the open position shown in FIG. 8, then tips the carrier forward and upwardly to slide the top cart frame member 28 from engagement with the second hook members. The carrier is then lifted to disengage the first hook members 36 from the bottom cart frame member 29.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A detachable carrier for a shopping cart having a cart basket defined in part by forward and rearward cart basket walls, the rearward cart basket wall including elevationally spaced horizontal top and bottom cart basket frame members, and having a handle situated rearwardly of the rearward cart basket wall, the carrier comprising:

a carrier basket including a carrier basket front wall;

first hook members attached to the carrier basket and extending forwardly of the carrier basket front wall;

each of said first hook members defining an associated open cart basket frame member receiving recess;

second hook members attached to the carrier basket and extending forwardly of the carrier basket front wall, each of the second hook members defining an associated open cart basket frame member receiving throat substantially facing the front carrier basket wall;

latch tubes slidably mounted on each of the second hook members, said latch tubes having with length dimensions substantially spanning the associated open cart basket frame member receiving throat;

each of the latch tubes being movable from a latching position wherein the latch tube substantially spans the associated open cart basket frame member receiving throat, and an open position wherein the latch tube is substantially clear of the associated open cart basket frame member receiving throat.

2. A detachable carrier for a shopping cart as claimed by claim 1 wherein the first hook members are formed by rods the first hook members including:

first upwardly bent portions leading to forwardly bent portions and leading to downwardly bent portions; and wherein all of the bent portions on each of the first hook members define the associated open cart basket frame receiving recess.

3. A detachable carrier for a shopping cart as claimed by claim 1 wherein the first hook members are formed by rods the first hook members including:

first upwardly bent portions leading to forwardly bent portions and leading to downwardly bent portions;

wherein all of the bent portions on each of the first hook members define the associated open cart basket frame receiving recess; and wherein the forwardly bent portions are positioned above the first upwardly bent portions.

4. A detachable carrier for a shopping cart as claimed by claim 1 wherein the second hook members are upwardly inclined from the carrier basket.

5. A detachable carrier for a shopping cart as claimed by claim 1 wherein the latch tubes include forward and rearward latch tube ends wherein the rearward latch tube ends are capable of abutting the front wall of the carrier basket, the latch tubes length dimensions having a sufficient length such that when the rearward latch tube ends abut the front wall of the carrier basket, the forward latch tube ends extend into the associated throat of the second hook members.

6. A detachable carrier for a shopping cart as claimed by claim 1 wherein each of the second hook members includes a first end connected to the carrier basket and a second end, the second end having a rearwardly extending bend section defining the associated open cart basket frame member receiving throat and the latch tubes include forward and rearward ends wherein the rearward latch tube ends are capable of abutting the front wall of the carrier basket, the latch tubes length dimensions having a sufficient length such that a maximum axial spacing between the forward tube ends and the second ends of the second hook members is less than a diameter of a cart basket frame member to be received within the cart basket frame member receiving throats, with the rearward latch tube ends abutting the carrier basket.

7. A detachable carrier for a shopping cart as claimed by claim 1 wherein each of the second hook members includes a first end connected to the carrier basket and a second end, the second end having a rearwardly extending bend section defining the associated open cart basket frame member receiving throat, the latch tubes include outside diameters which are slightly greater than an axial dimension between the an intermediate shank portion of the second hook members intermediate the first and second ends of the second hook members and the rearwardly extending bend section of the second hook members.

8. A detachable carrier for a shopping cart as claimed by claim 1 wherein the first hook members are formed by rods the first hook members including:
first upwardly bent portions leading to forwardly bent portions and leading to downwardly bent portions;
wherein all of the bent portions on each of the first hook members define the associated open cart basket frame receiving recess; and
wherein the second hook members are upwardly inclined from the carrier basket.

9. A detachable carrier for a shopping cart as claimed by claim 8 wherein the forwardly bent portions of the first hook members are positioned above the first upwardly bent portions
wherein the second hook members are upwardly inclined from the carrier basket.

10. A detachable carrier for a shopping cart as claimed by claim 1 wherein each of the second hook members includes a first end connected to the carrier basket and a second end, the second end having a rearwardly extending bend section defining the associated open cart basket frame member receiving throat and the latch tubes include forward and rearward ends wherein the rearward latch tube ends are capable of abutting the front wall of the carrier basket, the latch tubes length dimensions having a sufficient length such that a maximum axial spacing between the forward tube ends and the second ends of the second hook members is less than a diameter of a cart basket frame member to be received within the cart basket frame member receiving throats, with the rearward latch tube ends abutting the carrier basket; and
wherein the latch tubes include tube outside diameters slightly greater than an axial dimension between an intermediate shank portion of the second hook members intermediate the first and second ends of the second hook members and the rearwardly extending bend section of the second hook members.

11. A detachable carrier for a shopping cart as claimed by claim 1 wherein the carrier basket front wall includes a top and a bottom and wherein there are two first hook members extending from the carrier basket front wall at the carrier basket front wall bottom.

12. A detachable carrier for a shopping cart as claimed by claim 1 wherein the carrier basket front wall includes a top and a bottom and wherein there are two first hook members extending from the carrier basket at the carrier basket front wall bottom, and two second hook members extending from the carrier basket at the carrier basket front wall top.

* * * * *